(12) United States Patent
Williams

(10) Patent No.: US 8,430,634 B2
(45) Date of Patent: Apr. 30, 2013

(54) SYSTEM AND METHOD FOR IMPROVING WIND TURBINE EFFICIENCY BY ADJUSTING BLADE PITCH IN RESPONSE TO LOCALIZED WIND SPEED

(76) Inventor: Herbert Williams, Palatka, FL (US)

( * ) Notice: Subject to any disclaimer, the term of this patent is extended or adjusted under 35 U.S.C. 154(b) by 758 days.

(21) Appl. No.: 12/658,130

(22) Filed: Feb. 3, 2010

(65) Prior Publication Data
US 2011/0188986 A1  Aug. 4, 2011

(51) Int. Cl.
*F03D 7/04* (2006.01)
(52) U.S. Cl.
USPC .................. 416/41; 416/40; 416/61; 416/155; 416/189; 416/1
(58) Field of Classification Search ............. 416/40, 416/41, 61, 155, 189, 1; 415/4.3, 4.5, 130, 415/118; 290/44, 55
See application file for complete search history.

(56) References Cited

U.S. PATENT DOCUMENTS

| | | | | |
|---|---|---|---|---|
| 4,330,714 A * | 5/1982 | Smith | ........................... | 290/55 |
| 6,064,123 A * | 5/2000 | Gislason | ........................ | 290/55 |
| 7,086,835 B2 * | 8/2006 | Yoshida | ........................... | 416/9 |
| 7,487,673 B2 * | 2/2009 | Ormel et al. | ............... | 73/170.07 |
| 2007/0166159 A1 | 7/2007 | Williams | | |
| 2008/0078228 A1 | 4/2008 | Nies | | |
| 2009/0169379 A1 | 7/2009 | McClintic | | |
| 2010/0014969 A1 | 1/2010 | Wilson et al. | | |

FOREIGN PATENT DOCUMENTS
WO  WO2009/025548  2/2009

* cited by examiner

*Primary Examiner* — Ninh H Nguyen
(74) *Attorney, Agent, or Firm* — Thomas C. Saitta

(57) ABSTRACT

A wind turbine for generating electrical power, the turbine having a rotor assembly comprising a hub, a rim and a plurality of blade members extending between the hub and rim, and at least two anemometers mounted at stationary locations relative to the rotor assembly or on the rotor assembly itself, wherein the pitch of individual blade members is adjustable in response to differences in wind speed detected by the anemometers as the rotor assembly rotates.

13 Claims, 2 Drawing Sheets

SYSTEM AND METHOD FOR IMPROVING WIND TURBINE EFFICIENCY BY ADJUSTING BLADE PITCH IN RESPONSE TO LOCALIZED WIND SPEED

BACKGROUND OF THE INVENTION

The invention relates generally to the field of fluid driven turbines, such as wind turbines, wherein electrical power is generated from airflow across rotor blades. More particularly, the invention relates to such turbines wherein the blades extend from a central rotating hub or shaft member to an annular rotating ring or rim member. Even more particularly, the invention relates to mechanisms and methods for adjusting the pitch of the blades to maximize efficiency.

Wind turbines, also known as windmills, wind generators, wind machines or the like, are well known devices for producing energy, typically electrical energy, by harnessing the power of wind. Typical wind turbines are very large structures, standing hundreds of feet tall and having rotor blades extending hundreds of feet, the rotor blades being mounted to a central hub or shaft. Large elongated blades are required since the area of blade sweep is proportional to the power that can be produced by a given wind turbine. This size creates a problem, in that each blade must act as a cantilever that can support the elongated blade and the blades must be increasingly massive toward the central hub in order to preclude the blade from breaking during use. Even with the use of high tech composites, carbon fibers and the like, a practical limit has been reached. For example, most large wind turbines have three blades, as this has been found to be the most efficient design. The desire to increase blade length in order to capture more wind is offset by the accompanying reduction in shaft revolutions per minute (rpm). Reduced rpm's require larger reduction gearboxes, which is undesirable. Decreasing blade pitch in order to increase the rpm's reduces torque, which is undesirable. In addition, repair or replacement of these giant blades is difficult and can be extremely expensive. The cost of upkeep and repair reduces the overall benefits of energy production using wind technology. Thus, known wind turbine designs always have to make sacrifices in order to balance these competing factors.

An alternative type of wind turbine incorporates an outer, annular ring or rim that is joined to the blades, such that the blade tips are no longer self-supporting and thereby allowing the blades to be lighter and/or longer, easier to manufacture and repair, etc. The blades extend from the central rotating hub or shaft to the annular rim and are therefore supported at both ends. In this embodiment, it is also known to utilize the rotational energy from the rotating annular rim rather than the central hub, since the annular rim travels at much faster speed. Rollers, wheels, gears, magnets or the like are used to transfer the rotational energy from the rim to one or more generator mechanisms or the like. Examples of such turbines are shown in U.S. Pat. No. 4,319,865 to Richard, U.S. Pat. No. 4,330,714 to Smith, U.S. Pat. No. 4,350,895 to Cook, U.S. Pat. No. 4,545,729 to Storm, U.S. Pat. No. 4,729,716 to Schmidt, and U.S. Pat. No. 6,664,655 to Vann. Such wind turbines are often of smaller size and utilize sail-like blades rather than complicated blade structures in order to increase the number of wind catching elements, since the weight of the annular rim adds structural problems to the design.

It is important in wind turbines to maintain a relatively steady rotation rate, since this allows for simpler gearbox or other rotation transfer mechanisms. Since wind speed will vary, it is known to provide mechanisms and methods for adjusting the pitch of the blades to account for stronger or weaker winds. This can be accomplished by measuring the wind speed directly or by measuring the rate of rotation of the rotor assembly and then adjusting the blade pitch as required to keep the rotation rate within desired parameters. While this addresses the problem on a macro scale, the known solutions do not take into account localized variations in wind speed striking the rotor assembly at different locations. For example, especially with large diameter wind turbines, the wind speed at the top of the rotor assembly may be significantly greater than the wind speed at the bottom of the rotor assembly. This variation in wind speed also negatively stresses the rotor assembly, which can damage the wind turbine.

It is an object of this invention to provide a system and a method that measures localized wind speed at various points on the wind turbine or the rotor assembly, such that the blade pitch of each individual blade can be more precisely adjusted in response to the actual wind speed being encountered as the blade rotates about the central hub.

SUMMARY OF THE INVENTION

The invention is a wind turbine for generating electrical power, the wind turbine comprising a rotating rotor assembly comprising a rotating central hub member and a rotating annular rim member, the rim member joined to the hub by a plurality of blade members. The blade members are mounted to the hub and rim such that the pitch of each blade can be adjusted independently of the other blades and while the rotor assembly is rotating. In order to maintain the rotation rate within desired parameters, the pitch of the blades are reduced in low winds and increased in high winds. The invention is a system and method that accounts for variations in wind speed at different points relative to the wind turbine, such as at the bottom and top of the rotor assembly, such that the pitch of each blade is adjusted in response to the encountered wind speed at predetermined locations or at any location as the rotor assembly rotates.

In one embodiment, means for measuring wind speed, such as a wind gauges or anemometers, are provided at stationary, fixed positions on the wind turbine, such as for example adjacent the top and the bottom of the rotor assembly. Wind speed measurements at each location are then utilized to adjust the pitch of each blade as it moves through a full rotation. For example, if the wind speed at the top of the rotor assembly is greater than at the bottom of the rotor assembly, the pitch of each upwardly moving blade will be increased to account for the higher wind speed. After it passes the top and begins downward movement, the pitch will be decreased to account for the lower wind speed occurring at the bottom of the rotor assembly.

In an alternative embodiment, a plurality of means for measuring wind speed are mounted onto the annular rim member at spaced intervals such that the means for measuring wind speed rotate with the rotor assembly. In one embodiment, each blade will have a corresponding or dedicated means for measuring wind speed. If necessary, rotational effects that may alter the wind speed measurement will be accounted for by software or shielding means such that a true wind speed reading is obtained. The means for measuring wind speed may be located at or on the rim itself, or they may be positioned between the rim and the hub using struts, extended arm members or the like.

DETAILED DESCRIPTION OF THE INVENTION

With reference to the drawings, the invention will now be described in detail with regard for the best mode and the preferred embodiment. In a broad sense, the invention is a fluid powered turbine, such as a wind turbine, where airflow rotates a rotor assembly on a central shaft or hub member, whereby electrical power or the like is generated by the rotational energy, and wherein the rotor element comprises a plurality of blade members extending from the rotating central hub member to a rotating annular rim member.

Figure 1:
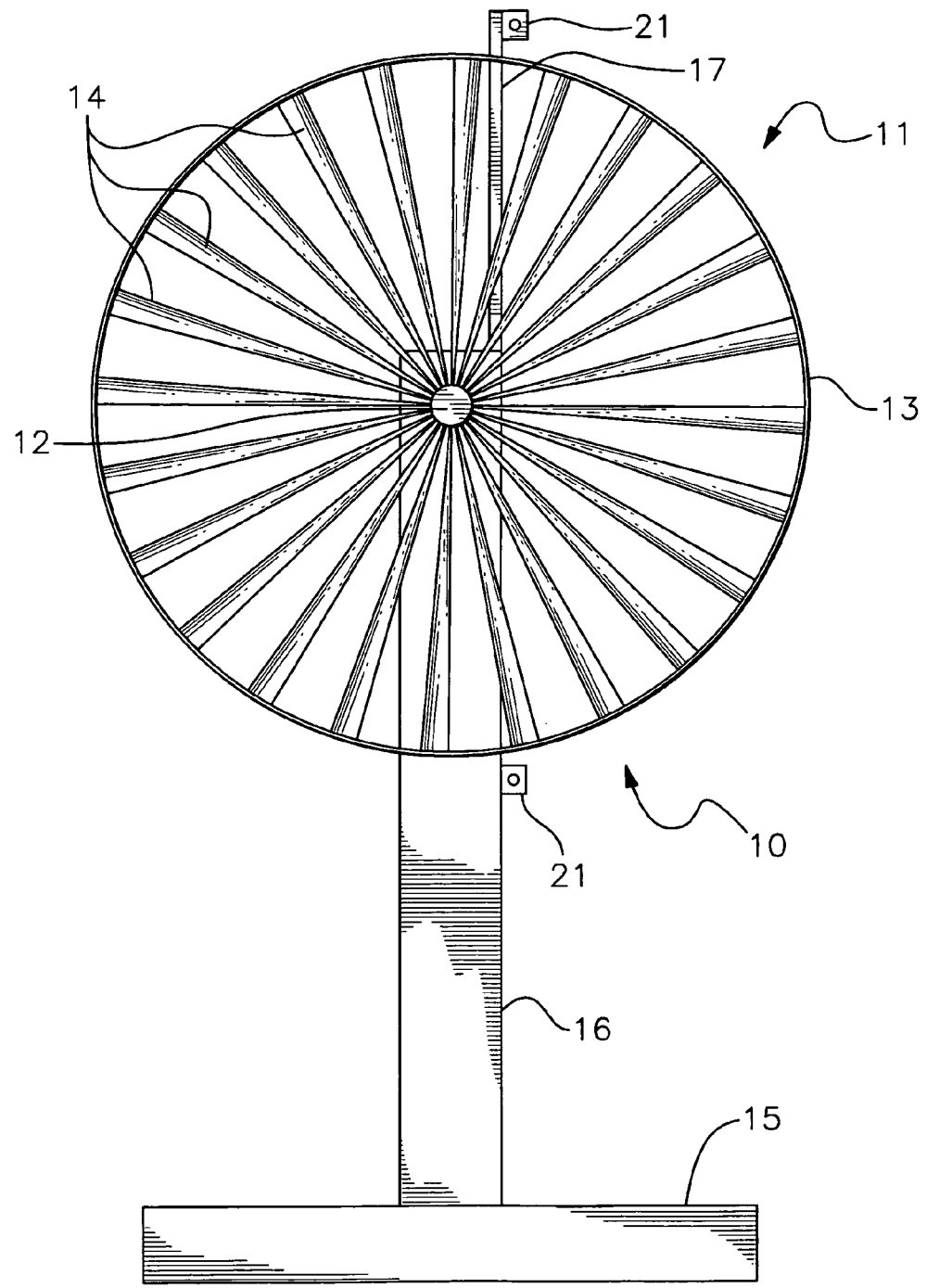
FIG. 1 is a simple illustration of a wind turbine consisting of a rotating hub, a rotating annular outer rim and a plurality of blades extending from the hub to the rim, with stationary means for measuring wind speed.

As shown in FIG. 1, a typical turbine 10 comprises a rotor assembly 11 mounted onto a fixed support means, such as a base 15 and tower 16, whereby the rotor assembly 11 is positioned to have a generally horizontal axis of rotation in order to capture wind passing across the ground surface. The turbine may be of any size, and the structure as described herein is suitable for relatively large turbines, wherein the diameter of the rotor assembly 11 may be hundreds of feet.

The rotor assembly 11 comprises a central rotating hub or shaft member 12, which is mounted in suitable manner to a tower 16 such that the rotor assembly 11 can rotate relative to the fixed support means. The rotor assembly 11 further comprises an outer or peripheral annular ring or rim member 13, with a plurality of blade members 14 extending between the rim member 13 and the central hub member 12, the blade members 14 being the means to capture the energy of the wind and translate that energy into rotational movement.

Figure 2:
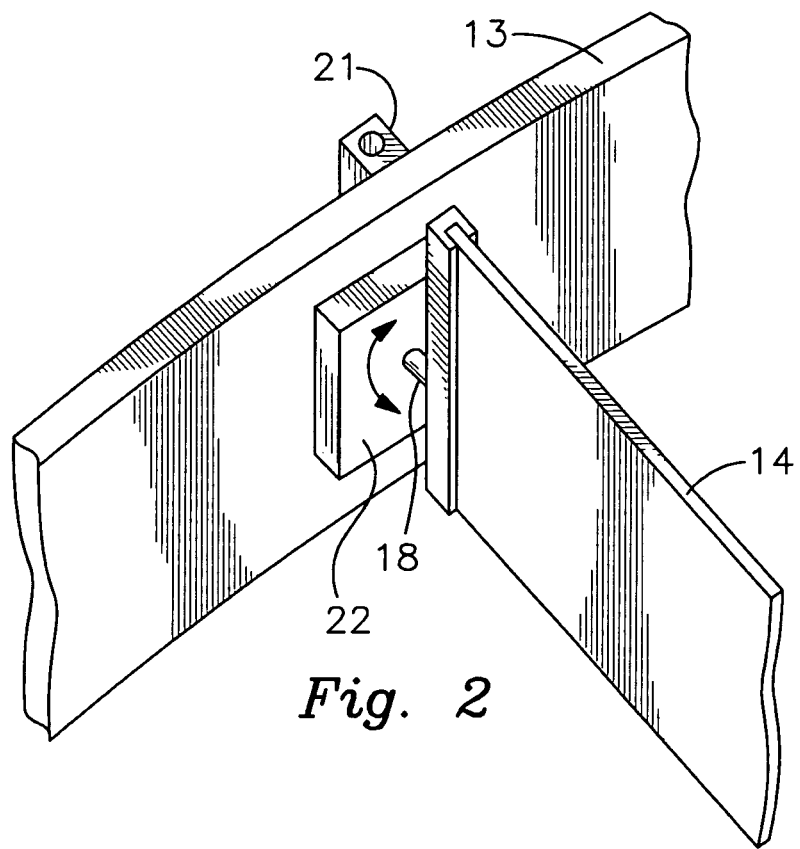
FIG. 2 is partial view showing a blade mounted onto the rim, with means for adjusting the pitch of the blade and means for measuring wind speed mounted onto the rim.

The blade members 14 are mounted to the hub 12 and rim 13 by suitable mechanical means for retaining the blades 14 therebetween. The blades 14 are be joined to the hub 12 and rim 13 in a manner that allows at least one of the blade ends to be adjusted so as to alter the pitch of the blade 14. Preferably the interior ends of the blades 14 are mounted to the hub 12 in fixed manner, preferably at an angle of about five to ten degrees off the main hub axis, and the exterior ends are mounted to the rim 13 in a manner that allows the exterior ends to be pivoted, such as for example utilizing a mounting shaft, as shown in FIG. 2.

Means 22 for adjusting the blade pitch are provided such that the pitch of each blade 14 can be individually adjusted to increase or decrease the pitch in response to the encountered localized wind speed. Any suitable powered mechanism or assembly, such as servo motors or the like, may be utilized to alter the blade pitch, typically by pivoting the exterior end of the blade 14 about the shaft 18.

The wind turbine 10 further comprises at least two means 21 for measuring wind speed, such as an anemometer or wind gauge, whereby the measured localized wind speed is utilized to determine the proper blade pitch at a given blade location. In one embodiment, the means 21 for measuring wind speed are provided in stationary, fixed locations relative to the wind turbine 10 and rotor assembly 11, as shown in FIG. 1. In the illustration, a first means 21 for measuring wind speed is positioned on a mounting arm member 17 such that it is located at or near the top of the rotor assembly 11, while a second means 21 for measuring wind speed is positioned near the bottom of the rotor assembly 11. This set-up addresses the most common occurrence of wind speed variation, wherein the upper winds are of greater velocity than the lower winds nearer the ground surface.

In this manner, the wind speed at the top and at the bottom of the rotor assembly 11 is measured. As an individual blade member 14 rotates upwardly toward the top means 21 for measuring wind speed, the measured wind speed information from this detector is provided to the operating system of the means 22 for adjusting the blade pitch, many such operating systems being known and typically including a computer processor. The pitch of the blade 14 is then adjusted to the optimum value for the wind speed measured at the top of the rotor assembly 11. As the blade 14 passes the apex and begins downward rotation toward the bottom means 21 for measuring wind speed, the measured wind speed information from this detector is now provided to the operating system of the means 22 for adjusting the blade pitch. The pitch of the blade 14 is then adjusted to the optimum value for this measured wind speed, which is very likely different from the wind speed at the top of the rotor assembly 11, and thus the optimum pitch will now differ. In like manner, the pitch for all blade members 14 are adjusted as they rotate about the central hub 12 depending on their position at any given moment. The sensitivity of the system can be increased by increasing the number of means 21 for measuring wind speed.

Figure 3:
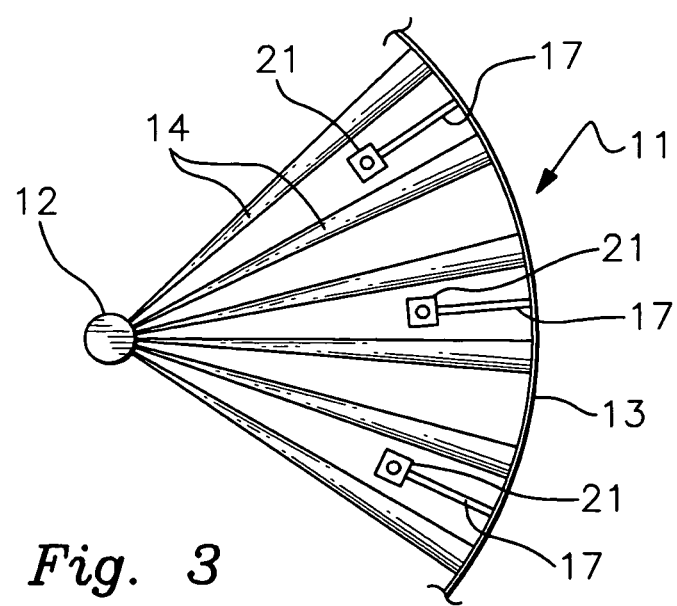
FIG. 3 is a partial view showing a rotor assembly having a plurality of means for measuring wind speed located at points between the rim and the hub.

In an alternate embodiment shown in FIG. 2, a plurality of means 21 for measuring wind speed are mounted onto the annular rim 13. A given means 21 for measuring wind speed may control the means 22 for adjusting blade pitch of several blade members 14 simultaneously, but preferably there is an equal number of means 21 for measuring wind speed and blades 14, such that each blade 14 has a dedicated means 21 for measuring wind speed controlling its means 22 for adjusting blade pitch. With this structure, the localized variation in wind speed during the entire rotation can be accounted for. Inaccuracies in measurement of wind speed resulting from the rotation of the means 21 for measuring wind speed can be corrected through software programming or by providing shielding structures as necessary. In another alternative embodiment, as shown in FIG. 3, the means 21 for measuring wind speed can be positioned between the hub 12 and rim 13 by mounting them on a strut or mounting arm 17.

With the non-stationary means 21 for measuring wind speed, precise control of the blade pitch and immediate response can be obtained, thereby maximizing the efficiency of the wind turbine 10. By adjusting the blade pitch, the desired speed of rotation is easily maintained. In addition, immediate adjustment of the blade pitch in response to wind speed variation reduces the wind force stresses on the rotor assembly 11, thereby increasing the longevity of the wind turbine 10.

It is understood that equivalents and substitutions for certain elements set forth above may be obvious to those skilled in the art, and therefore the true scope and definition of the invention is to be as set forth in the following claims.

I claim:

1. A wind turbine comprising:
a rotor assembly comprising a rotating central hub member, a rotating annular rim member, a plurality of blade members extending between said rim member and said hub member, and means for adjusting the pitch of each blade member, the pitch of each said blade member being individually adjustable while said rotor assembly is rotating;
said wind turbine further comprising at least two means for measuring wind speed positioned at different locations relative to said rotor assembly, such that as each said blade member rotates its pitch is adjusted in response to localized wind speed as measured by each of said means for measuring wind speed.

2. The wind turbine of claim 1, wherein said means for measuring wind speed are located at stationary positions.

3. The wind turbine of claim 2, wherein one of said means for measuring wind speed is located above said rotor assembly and another of said means for measuring wind speed is located below said rotor assembly.

4. The wind turbine of claim 1, wherein said means for measuring wind speed are located on said rotor assembly and move with said rotor assembly.

5. The wind turbine of claim 4, wherein said means for measuring wind speed are located on said rim member.

6. The wind turbine of claim 3, wherein said means for measuring wind speed are located between said hub member and said rim member.

7. The wind turbine of claim 4, wherein there are an equal number of said blade members and said means for measuring wind speed, such that each of said means for measuring wind speed controls the means for adjusting the pitch of a single blade member.

8. The wind turbine of claim 1, wherein said blade members are mounted to said hub and said rim in a pivoting manner.

9. The wind turbine of claim 1, wherein said composite blade members are mounted to said hub in a fixed position and are mounted to said rim in a pivoting manner.

10. A method of adjusting the pitch of wind turbine blades in response to variations in localized wind speed, said wind turbine comprising a rotor assembly comprising a rotating central hub member, a rotating annular rim member, a plurality of blade members extending between said rim member and said hub member, and means for adjusting the pitch of each blade member, the pitch of each said blade member being individually adjustable while said rotor assembly is rotating;

said wind turbine further comprising at least a first and second means for measuring wind speed at different locations relative to said rotor assembly, such that as each said blade member rotates its pitch is adjusted in response to localized wind speed as measured by each of said means for measuring wind speed;

said method comprising the steps of:

measuring the localized wind speed at a first location with said first means for measuring wind speed and adjusting the blade pitch of each blade member as it encounters the wind speed measured by said first means for measuring wind speed;

measuring the localized wind speed at a second location with said second means for measuring wind speed and adjusting the blade pitch of each blade member as it encounters the wind speed measured by said second means for measuring wind speed; and continually monitoring the localized wind speed at each said location and continually adjusting the pitch of the blade members.

11. The method of claim 10, wherein said step of measuring the localized wind speed at a first location is accomplished by measuring the wind speed at the top of the rotor assembly, and wherein said step of measuring the localized wind speed at a second location is accomplished by measuring the wind speed at the bottom of the rotor assembly.

12. The method of claim 10, wherein said step of measuring the localized wind speed at a first location is accomplished by measuring the wind speed at one location on the rotor assembly, and wherein said step of measuring the localized wind speed at a second location is accomplished by measuring the wind speed at a second location on the rotor assembly.

13. The method of claim 10, further comprising the steps of providing a plurality of said means for measuring wind speed equal in number to the number of said blade members and mounting said means for measuring wind speed on said rim member, such that each said blade member has a dedicated means for measuring wind speed.

* * * * *